Patented Aug. 16, 1938

2,127,446

UNITED STATES PATENT OFFICE 2,127,446

PROCESS FOR THE MANUFACTURE OF VITAMIN B₁

Max Klingenfuss, Basel, Switzerland, assignor to Hoffmann-La Roche Inc., Nutley, N. J., a corporation of New Jersey No Drawing. Application December 15, 1937, Serial No. 180,025. In Switzerland July 22, 1937

11 Claims. (Cl. 260—251)

It has been found that 2-methyl-2-alkoxy-3-chloro-tetrahydrofuranes, easily obtainable by the reaction between an aliphatic primary alcohol and aceto-chloro-butyrolactone in the presence of sulphuric acid, can be condensed with 2-methyl-4-amino-5-thioformyl-aminomethyl-pyrimidine to vitamin $B_1$. The conversion of 2-methyl-4-amino-5-thioformyl-aminomethyl-pyrimidine into vitamin $B_1$ is actually known (Journal of the Chemical Society, London, 1937, page 367) using 1-acetoxy-3-chloro-pentanone(4) for the reaction. No indication is given regarding the yield obtained. A very poor yield was obtained by following the directions given. Far better results are obtained by the present process.

It could not be anticipated that the chlorine-atom of 2-methyl-2-alkoxy-3-chloro-tetrahydrofuranes is sufficiently reactive for the reaction with 2-methyl-4-amino-5-thioformylamino-methyl-pyrimidine to proceed under very mild conditions. It is still more surprising that the thiazole-ring is formed under these conditions when this is only possible after rupture of the furane-ring.

The reaction can be illustrated by the following formula:

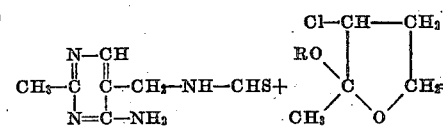 + 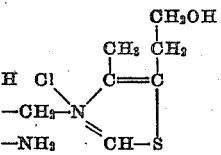

It is evident that other N-mono-substituted derivatives of thioamides can also be converted into 4-methyl-5-oxy-ethyl-thiazolium compounds in this manner; but of the further representatives of this class of substances so far obtained none shows remarkable physiological effects.

For carrying out the reaction it is advantageous to employ a solvent. The most suitable solvents are: water in the presence of an equivalent of mineral acid, highly concentrated acetic acid and highly concentrated formic acid. Condensing agents can also be used.

Example 1

18.2 parts by weight of 2-methyl-4-amino-5-thioformyl-aminomethyl-pyrimidine are dissolved in a mixture of 16.5 parts by weight of 2-methyl-2-ethoxy-3-chloro-tetrahydrofurane and 35 parts by weight of 95% formic acid and heated for 20 hours at 45–50° C. After cooling the product is taken up in 100 parts by weight of $3n$ hydrochloric acid. The solution is clarified by the filtration and concentrated in vacuo to 50–60 parts by weight at moderate temperature and the residue precipitated with 400 parts by weight of absolute alcohol, whereby the resulting vitamin $B_1$ separates in crystals. The recrystallized product melts at 248–250° C. Yield 15 parts by weight.

Example 2

11 parts by weight of calcium-bromide (with 20% of water) are dissolved in 40 parts by weight of 80% acetic acid and 18.2 parts by weight of 2-methyl-4-amino-5-thioformylamino-methyl-pyrimidine added. After a short time the hydrobromide of the pyrimidine precipitates which causes the whole to solidify. 15 parts by weight of 2-methyl-2-methoxy-3-chloro-tetrahydrofurane are then added and stirred for 10 hours at 40° C. After this time, a nearly homogeneous solution is obtained, from which 18 parts by weight of vitamin $B_1$ are isolated by working up in accordance with Example 1.

I claim:

1. Process for the manufacture of vitamin $B_1$ which comprises reacting 2-methyl-2-alkoxy-3-chloro-tetrahydrofurane with 2-methyl-4-amino-5-thioformylaminomethyl-pyrimidine.

2. Process for the manufacture of vitamin $B_1$ which comprises reacting 2-methyl-2-alkoxy-3-chloro-tetrahydrofurane with 2-methyl-4-amino-5-thioformylaminomethyl-pyrimidine in the presence of a solvent.

3. Process for the manufacture of vitamin $B_1$ which comprises reacting 2-methyl-2-alkoxy-3-chloro-tetrahydrofurane with 2-methyl-4-amino-5-thioformylaminomethyl-pyrimidine in the presence of formic acid.

4. Process for the manufacture of vitamin $B_1$ which comprises reacting 2-methyl-2-alkoxy-3-chloro-tetrahydrofurane with 2-methyl-4-amino-5-thioformylaminomethyl-pyrimidine in the presence of acetic acid.

5. Process for the manufacture of vitamin $B_1$ which comprises reacting 2-methyl-2-alkoxy-3-chloro-tetrahydrofurane with 2-methyl-4- amino-5-thioformylaminomethyl-pyrimidine in the presence of a solvent and calcium bromide.

6. Process for the manufacture of vitamin $B_1$ which comprises reacting 2-methyl-2-methoxy-3-chloro-tetrahydrofurane with 2-methyl-4-amino-5-thioformylaminomethyl-pyrimidine.

7. Process for the manufacture of vitamin $B_1$ which comprises reacting 2-methyl-2-ethoxy-3-chloro-tetrahydrofurane with 2-methyl-4-amino-5-thioformylaminomethyl-pyrimidine.

8. Process for the manufacture of vitamin $B_1$ which comprises reacting 2-methyl-2-methoxy-3-chloro-tetrahydrofurane with 2-methyl-4-amino-5-thioformylaminomethyl-pyrimidine in the presence of formic acid.

9. Process for the manufacture of vitamin $B_1$ which comprises reacting 2-methyl-2-ethoxy-3-chloro-tetrahydrofurane with 2-methyl-4-amino-5-thioformylaminomethyl-pyrimidine in the presence of formic acid.

10. Process for the manufacture of vitamin $B_1$ which comprises reacting 2-methyl-2-methoxy-3-chloro-tetrahydrofurane with 2-methyl-4-amino-5-thioformylaminomethyl-pyrimidine in the presence of formic acid and calcium bromide.

11. Process for the manufacture of vitamin $B_1$ which comprises reacting 2-methyl-2-ethoxy-3-chloro-tetrahydrofurane with 2-methyl-4-amino-5-thioformylaminomethyl-pyrimidine in the presence of formic acid and calcium bromide.

MAX KLINGENFUSS.